(12) United States Patent
Kim

(10) Patent No.: US 7,485,392 B2
(45) Date of Patent: Feb. 3, 2009

(54) RECHARGEABLE BATTERY HAVING IMPACT BUFFER FUNCTION

(75) Inventor: Hyon-Sok Kim, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 337 days.

(21) Appl. No.: 11/227,094

(22) Filed: Sep. 16, 2005

(65) Prior Publication Data

US 2006/0063069 A1    Mar. 23, 2006

(30) Foreign Application Priority Data

Sep. 21, 2004    (KR) .................. 10-2004-0075402

(51) Int. Cl.
*H01M 2/26* (2006.01)
(52) U.S. Cl. .................. 429/161; 429/164; 429/211
(58) Field of Classification Search .................. 429/94, 429/161, 174, 211
See application file for complete search history.

(56) References Cited

U.S. PATENT DOCUMENTS

| | | | |
|---|---|---|---|
| 6,193,765 B1 | 2/2001 | Nakanishi | |
| 6,653,017 B2 * | 11/2003 | Satoh et al. | 429/178 |
| 6,692,863 B1 * | 2/2004 | Nakanishi et al. | 429/94 |
| 2002/0110729 A1 * | 8/2002 | Hozumi et al. | 429/130 |
| 2004/0023107 A1 * | 2/2004 | Nakanishi et al. | 429/161 |
| 2005/0147878 A1 * | 7/2005 | Miyahisa et al. | 429/174 |

* cited by examiner

*Primary Examiner*—Susy Tsang-Foster
*Assistant Examiner*—Maria J. Laios
(74) *Attorney, Agent, or Firm*—H.C. Park & Associates, PLC

(57) ABSTRACT

A rechargeable battery comprises an electrode assembly including a positive electrode, a negative electrode, and a separator interposed therebetween. The battery further comprises a case for housing the electrode assembly, a cap assembly coupled with the case, and a collecting plate having a first fixing portion coupled with the positive electrode or the negative electrode and a second fixing portion coupled with the case. A buffer portion is provided between the first fixing portion and the second fixing portion to alleviate forces exerted on the collecting plate.

18 Claims, 3 Drawing Sheets

RECHARGEABLE BATTERY HAVING IMPACT BUFFER FUNCTION

CROSS REFERENCE TO RELATED APPLICATION

This application claims priority to and the benefit of Korean Patent Application No. 10-2004-0075402, filed on Sep. 21, 2004, which is hereby incorporated by reference.

BACKGROUND OF THE INVENTION

1. Field of the Invention

The present invention relates to a rechargeable battery, and more particularly, to a collecting plate of a rechargeable battery.

2. Description of the Background

Unlike nonrechargeable batteries that are incapable of being recharged, rechargeable batteries may be charged repeatedly. Recently, high-power rechargeable batteries that use a non-aqueous electrolyte that has high energy density have been used. Low capacity rechargeable batteries that have one battery cell that is packaged into a pack are used in small portable electronic devices such as cellular phones, laptop computers, and camcorders. High capacity rechargeable batteries that have numerous battery cells connected in series or in parallel are used as a power source for driving motors such as in hybrid electronic vehicles.

A rechargeable battery may have various shapes such as cylindrical, rectangular box, and pouch shapes. The rechargeable battery comprises an electrode assembly including a positive electrode, a negative electrode, and a separator interposed therebetween. The electrode assembly is wound spirally (like a jelly roll) and inserted into a case. The case is provided with a cap assembly having external terminals.

The positive electrode and negative electrode of the rechargeable battery are provided with conductive tabs to collect a current that is generated by an electrode assembly during operation of the battery and to transfer the current to the external terminals.

When a rechargeable battery is used in a high power device, the aforementioned tabs may be replaced with a collecting plate to reduce resistance of a current collecting portion. A rechargeable battery that uses the collecting plate is disclosed in U.S. Pat. No. 6,193,765.

When a typical rechargeable battery is shaken due to external impact or an interval problem, the collecting plate may become detached from the electrode assembly or the case. Furthermore, the collecting plate may be damaged or broken.

In the conventional rechargeable battery, since there is a clearance between the electrode assembly and the case to which the collecting plate is fixed, the electrode assembly may be shaken. The shaking may deteriorate the connection between the collecting plate and the electrode assembly. Furthermore, the collecting plate may become detached from the electrode assembly or the case causing a malfunction in the rechargeable battery.

In particular, if the rechargeable battery is used as a large capacity rechargeable battery for a vacuum cleaner, an electric scooter, an electric vehicle, or a hybrid vehicle, an external impact or internal vibration may be continuously exerted on the rechargeable battery thus, exacerbating the problem.

In particular, welded portions of the electrode assembly may become increasingly fatigued due to the continuous impact or vibration causing the collecting plate to be detached from the fixed portions.

SUMMARY OF THE INVENTION

The present invention provides a rechargeable battery that may prevent a collecting plate from detaching from an electrode assembly due to vibration or impact.

Additional features of the invention will be set forth in the description which follows, and in part will be apparent from the description, or may be learned by practice of the invention.

The present invention discloses a rechargeable battery comprising an electrode assembly that includes a positive electrode, a negative electrode, and a separator interposed therebetween. The battery further comprises a case that houses the electrode assembly, a cap assembly that is coupled with the case, and a collecting plate. The collecting plate has a first fixing portion that is coupled with the positive electrode or the negative electrode and a second fixing portion that is coupled with the case. A buffer portion is provided between the first fixing portion and the second fixing portions to alleviate a force that is exerted on the collecting plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Embodiments of the present invention may be used as a power source for driving a high power motor such as those in a hybrid electric vehicle (HEV), an electric vehicle (EV), a cordless vacuum cleaner, an electric bicycle, and an electric scooter.

When an external force such as a vibration force and an impact is exerted on a rechargeable battery of the present invention, a collecting plate may be prevented from detaching from a fixing or welded position. In addition, reliability of the rechargeable battery may be increased to prolong lifespan of the rechargeable battery.

Although the present invention is described with respect to the negative collecting plate that is fixed to the case, one of ordinary skill may apply the present invention to a rechargeable battery where a positive collecting plate is fixed to the case.

Figure 1:
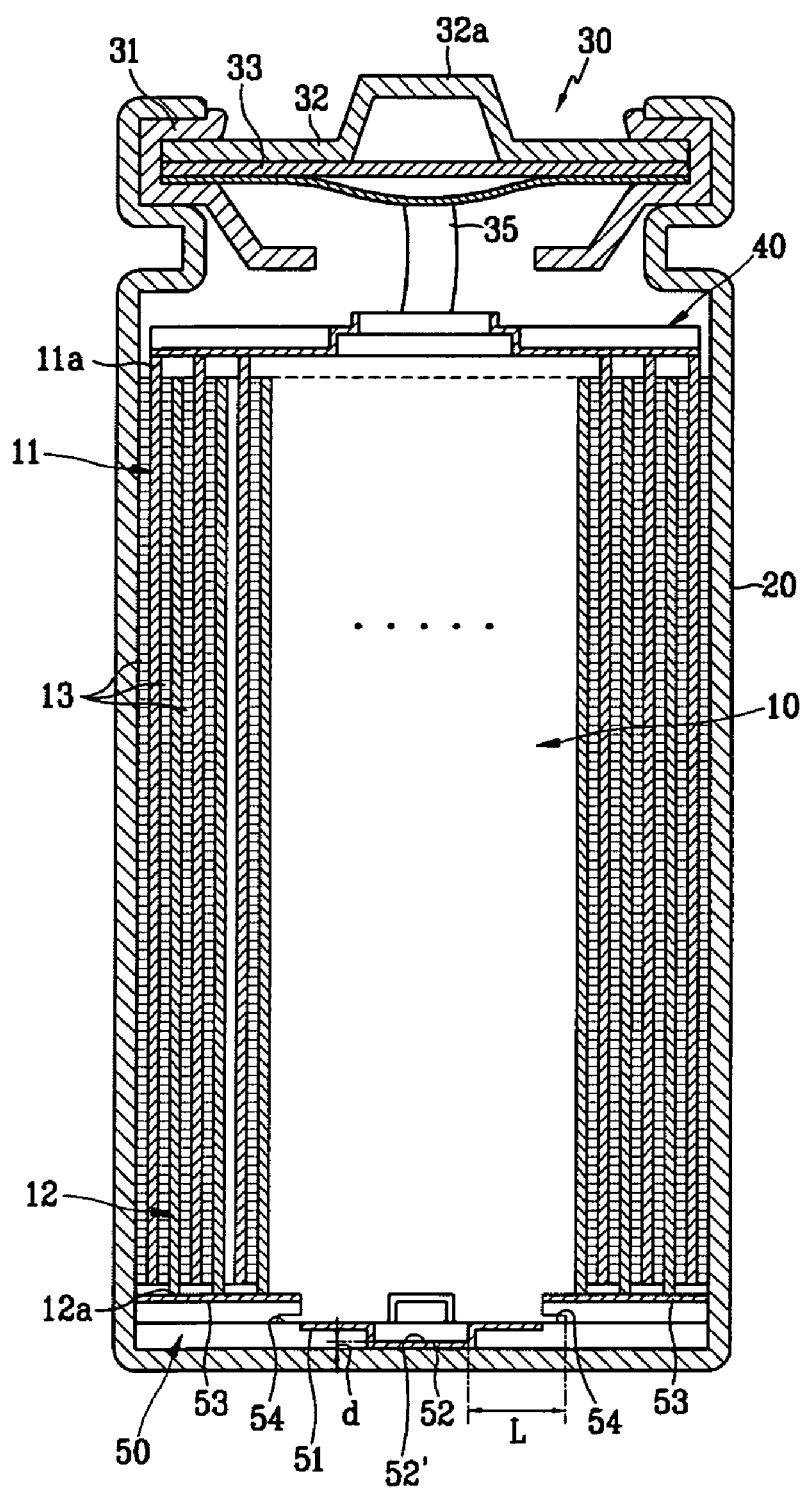
FIG. 1 is a cross sectional view of a rechargeable battery according to an exemplary embodiment of the present invention.

FIG. 1 is a cross sectional view of a rechargeable battery according to an exemplary embodiment of the present invention.

Referring to FIG. 1, the rechargeable battery of the present invention comprises an electrode assembly 10 comprising a positive electrode 11 and a negative electrode 12, and a separator 13 interposed therebetween. The battery further comprises a case 20 with an opening for accommodating the electrode assembly 10 and an electrolyte. A cap assembly 30 is coupled with the opening of the case 20 through a gasket 31 to seal the case 20. A positive collecting plate 40 is coupled with the positive electrode 11 of the electrode assembly 10 and a negative collecting plate 50 is coupled with the negative electrode 12 of the electrode assembly 10.

The case 20 comprises a conductive metal such as aluminum, an aluminum alloy, or nickel-plated steel. The case 20 may have a shape of a cylinder, a hexagon, or another shape that has a hollow internal space. The electrode assembly 10 is accommodated in the hollow internal space of the case 20.

The present invention exemplifies a substantially cylindrical shaped rechargeable battery. However, the present invention is not limited thereto, and the rechargeable battery of the present invention may have a rectangular shape, etc.

The electrode assembly 10 may have a stacked structure where the separator 13 is interposed between the positive electrode 11 and negative electrode 12. The positive electrode 11 and the negative electrode 12 may be constructed by coating an active material (not shown) on collectors 11a and 12a, respectively. Alternatively, the electrode assembly 10 may have a jelly roll structure where a stack of the positive electrode 11, the negative electrode 12, and the separator 13 are wound like a jelly roll. In the exemplary embodiment of the present invention shown in FIG. 1, the case 20 has a substantially cylindrical shape and the electrode assembly 10 has a shape of a jelly roll.

The electrode assembly 10 and collecting plates 40 and 50 are coupled with the positive electrode 11 and the negative electrode 12.

Portions of the positive electrode 11 and the negative electrode 12 on which the active material is not coated are called uncoated portions 11a and 12a, respectively. The uncoated portions 11a and 12a may contact the collecting plates 40 and 50, respectively.

The uncoated portions 11a and 12a of the positive electrode 11 and the negative electrodes 12, respectively, are disposed to face each other. In addition, the uncoated portions 11a and 12a are disposed to protrude higher than the separator 13.

The cap assembly 30 comprises a cap plate 32 with an external terminal 32a and a gasket 31 insulating the case 20 and the cap plate 32. The cap assembly 30 may further comprise a vent plate 33 that is coupled with the positive collecting plate 40 through a lead 35. The vent plate 33 prevents explosion of the battery by breaking release gas at a predetermined pressure.

The vent plate 33 is not limited to the structure shown in FIG. 1. Any structure that is capable of disconnecting an electric path between the electrode assembly 10 and the cap assembly 30 may be employed.

Figure 2:
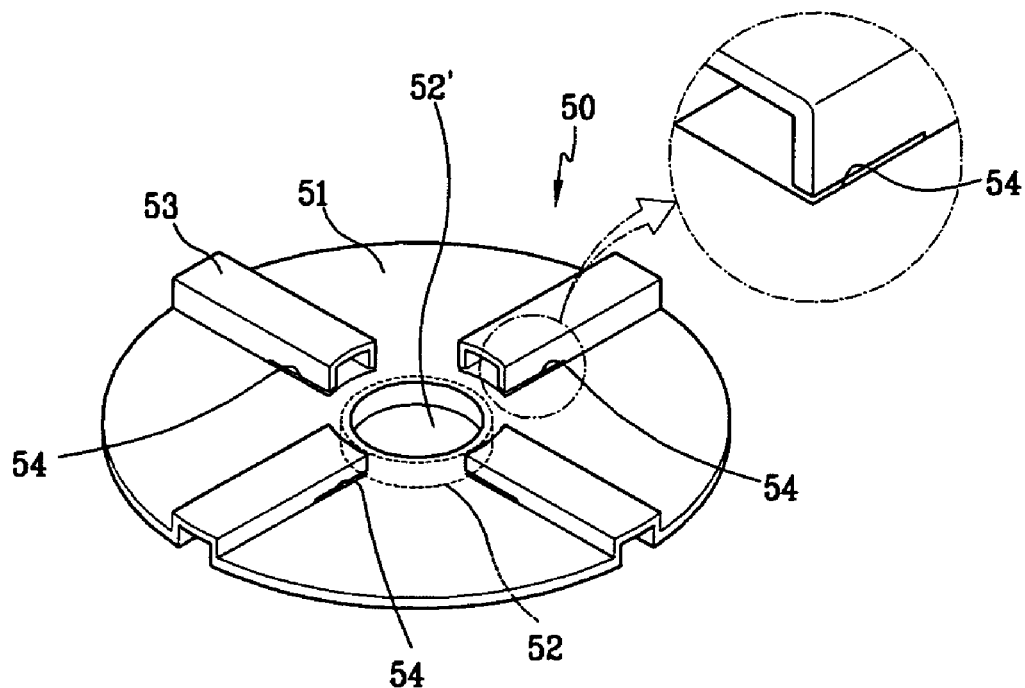
FIG. 2 is a perspective view of a negative collecting plate of the rechargeable battery according to the exemplary embodiment of the present invention.
Figure 3:
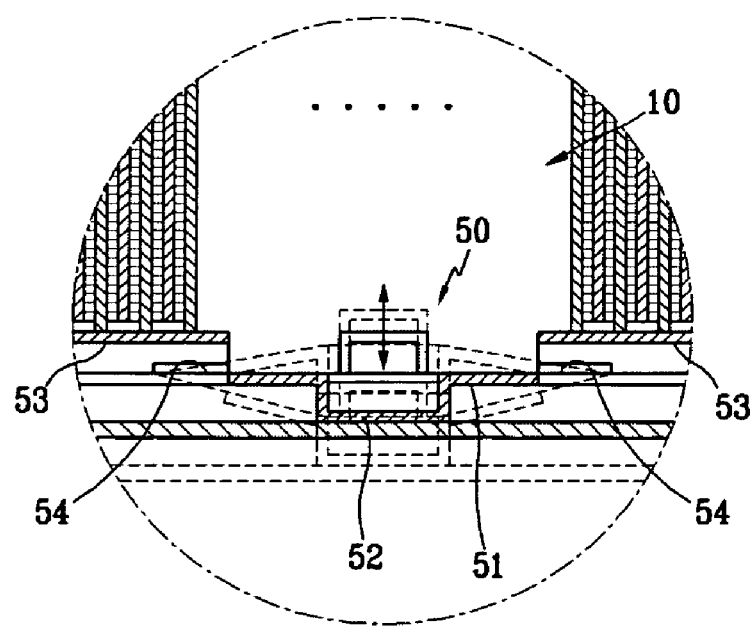
FIG. 3 is a partially elongated cross sectional view for explaining operations of the rechargeable battery according to the exemplary embodiment of the present invention.

FIG. 2 is a perspective view of a negative collecting plate of a rechargeable battery according to an exemplary embodiment of the present invention.

Referring to FIG. 2, the negative collecting plate 50 is formed as a substantially circular plate 51. A protrusion 52 is provided at a central portion of the plate 51 to protrude toward the case 20 so that the protrusion 52 may be coupled with an inner surface of the case 20. For example, the protrusion 52 may be welded to the inner surface of the case 20.

A recess 52' is formed on an inner surface of the protrusion 52. Four contacting parts 53 are disposed radially on the plate 51 around the recess 52' and are spaced at an angle of about 90°. In addition, contacting parts 53 may protrude toward the uncoated portion 12a, that is, in a direction opposite the protruding direction of the recess 52'.

The contacting parts 53 may have a slot shape. The contacting parts 53 together with the recess 52' may be formed by embossing a smooth plate 51.

The negative collecting plate 50 is coupled with the negative electrode 12 by coupling the contacting parts 53 with the uncoated portion 12a by laser welding, for example. Alternately, the negative collecting plate 50 may be coupled with the case 20 by coupling the protrusion 52 with the bottom of the case 20 by welding.

In the negative collecting plate 50, cut portions 54 are provided between the protrusion 52 and the contacting parts 53 to separate the protrusion 52 from the contacting parts 53. The cut portions 54 may be formed by cutting portions of the contacting parts 53 close to the recess 52' in the longitudinal directions of the contacting parts 53.

The aforementioned structure of the negative collecting plate 50 may serve as an impact buffer for the rechargeable battery. When an external force is exerted on the rechargeable battery, the force is transferred on a portion between a first fixing portion where the protrusion 52 is fixed and a second fixing portion where each of the contacting parts 53 is fixed. In this case, the buffer reduces the force that is exerted on the portion between the first fixing portion and the second fixing portion.

More specifically, according to the structure of the negative collecting plate 50, outer portions of the contacting parts 53 are integrally provided on the plate 51 and central portions (where the cut portions 54 are formed) of the contacting parts 53 are separated from the plate 51 by the cut portions.

According to the structure of the negative collecting plate 50, a distance between the protrusion 52 and the contacting parts 53 may vary.

In particular, the distance between the protrusion 52 (fixed to the case 20) and the contacting parts 53 (fixed to the uncoated portion 12a) may vary depending on the external force exerted on the rechargeable battery. When an external force is exerted on the rechargeable battery comprising the negative collecting plate 50, although the case 20 and the electrode assembly 10 are coupled with each other through the negative collecting plate 50, the electrode assembly 10 (or the case 20) may flexibly move up and down with respect to the case 20 (or the electrode assembly 10).

Here, the moving distances of the protrusion 52 and the contacting parts 53, that is, a stretching distance of the cut portions 54, has a close relation with a length of the cut portions 54. In the embodiment, the length of the cut portions 54 is determined based on the distance between the protrusion 52 and the contacting parts 53 within a tensile strength limit of the negative collecting plate 50. However, the length of the cut portions 54 is not limited to a specific length.

Preferably, if the negative collecting plate 50 has a thickness of d and a distal length between the protrusion 52 and the cut portions 54 is L, as shown in FIG. 1, the length L and thickness d have a relation represented by the following equation:

$$L > 5d$$

According to the rechargeable battery comprising the negative collecting plate 50 of the present invention, when an external force due to vibration or impact is exerted on the rechargeable battery, since there is a clearance between the electrode assembly 10 and the case 20, the electrode assembly 10 may move upward/downward or leftward/rightward.

If an external force is exerted on the rechargeable battery, the impact on a positive electrode side of the electrode assembly 10 may be alleviated due to the elastic buffer function of the lead 35. In addition, the impact on the negative collecting plate 50 may be alleviated due to the elastic buffer function of the cut portions 54 provided to the negative collecting plate 50.

When the electrode assembly 10 in the case 20 is shaken due to external impact exerted on the rechargeable battery, the cut portions 54 between the protrusion 52 and the contacting parts 53 are elastically stretched to compensate for the external force exerted on the plate 51 depending on the movement of the electrode assembly 10.

More specifically, if the electrode assembly 10 is coupled with the case 20 by the negative collecting plate 50, when a force is exerted on the rechargeable battery, the relative distance between the case 20 and the electrode assembly 10 varies, so that the plate 51 of the negative collecting plate 50 may be distorted.

However, according to the present invention, the negative collecting plate 50 may have a structure where the contacting parts 53 and the protrusion 52 may be elastically separated from each other by the cut portions 54. Therefore, in a case where there is a distortion in the plate 51, the cut portions 54 between the protrusion 52 and the contacting parts 53 are elastically stretched, so that the protrusion 52 can move up and down like a damper to alleviate the external force exerted on the plate 51.

As a result, when the electrode assembly 10 is shaken, the force exerted on the fixing portions between the contacting parts 53 and the protrusion 52 may be reduced to prevent the protrusion 52 and contacting parts 53 from being detached from the fixing portions.

Figure 4:
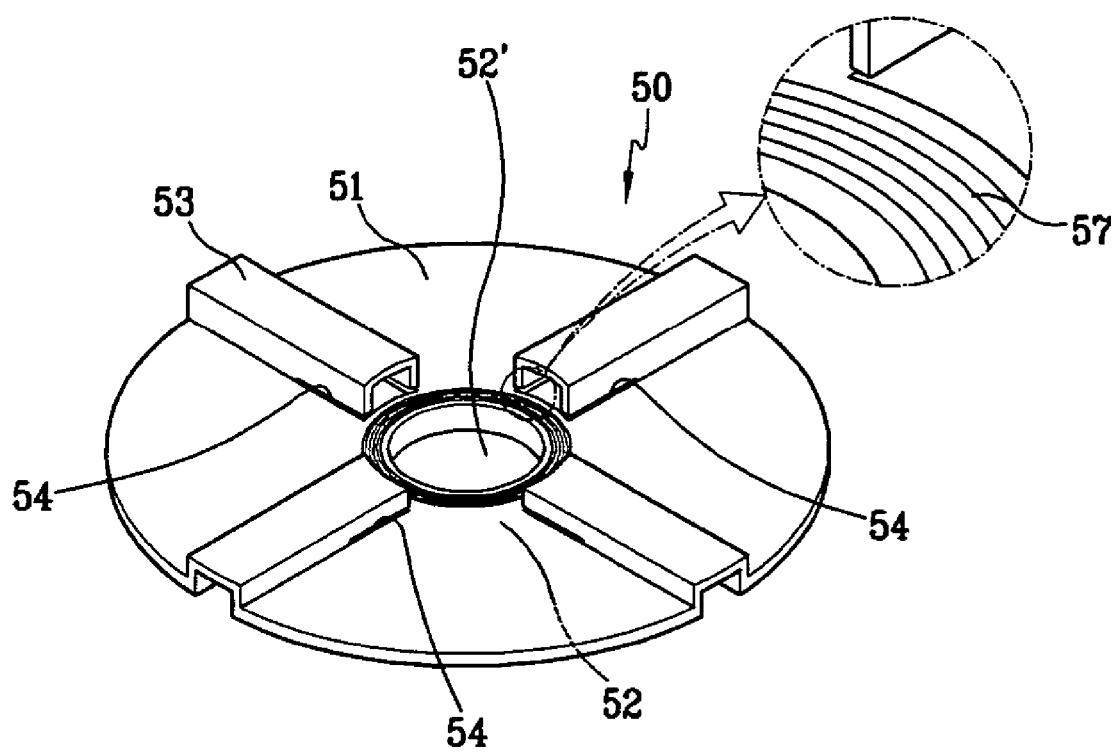
FIG. 4 is a perspective view of a negative collecting plate of a rechargeable battery according to another exemplary embodiment of the present invention.

FIG. 4 is a perspective view of a negative collecting plate 50 of a rechargeable battery according to another exemplary embodiment of the present invention. In the embodiment, a wrinkle portion 57 may be provided between the protrusion 52 and the contacting parts 53. The negative collecting plate 50 having the wrinkle portion makes it possible to more effectively reduce the force that is exerted on the fixing portion.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A battery, comprising:
an electrode assembly comprising a positive electrode, a negative electrode, and a separator interposed between the positive electrode and the negative electrode,
a case that houses the electrode assembly;
a cap assembly that is coupled with the case; and
a collecting plate having first fixing portion that is coupled with the positive electrode or the negative electrode and a second fixing portion that is coupled with the case, the second fixing portion being disposed at a central position of the collecting plate,
wherein a buffer portion is provided between the first fixing portion and the second fixing portion to alleviate a force exerted on the collecting plate.

2. The battery of claim 1,
wherein the first fixing portion and the second fixing portion are separated from each other.

3. The battery of claim 1,
wherein the second fixing portion comprises a protrusion that is coupled with an inner surface of the case;
wherein the first fixing portion comprises contacting parts that are coupled with an uncoated portion of the electrode assembly;
wherein the buffer portion comprises cut portions that are provided between the protrusion and the contacting parts, and
wherein the cut portions are formed by cutting portions of the contacting parts.

4. The battery of claim 3,
wherein a recess is formed on an inner surface of the protrusion.

5. The battery of claim 4,
wherein the recess is disposed at a central position of the collecting plate,
wherein the contacting parts are disposed radially about the collector plate, and
wherein the cut portions are disposed adjacent to the recess to extend in longitudinal directions of the contacting parts.

6. The battery of claim 3,
wherein wrinkle portions are provided between the protrusion and the cut portions.

7. The battery of claim 3,
wherein a thickness of the collecting plate, d and a distal length between the protrusion and a cut portion, L have a relationship represented by the following equation:

$$L > 5d.$$

8. The battery of claim 1,
wherein the rechargeable battery has a substantially cylindrical shape.

9. A motor, comprising:
the battery of claim 1.

10. The battery of claim 1,
wherein the second fixing portion is welded to the case.

11. A battery, comprising:
an electrode assembly comprising a positive electrode, a negative electrode, and a separator interposed between the positive electrode and the negative electrode,
a case that houses the electrode assembly;
a cap assembly that is coupled with the case; and
a collecting plate comprising first fixing portions that are coupled with the positive electrode or the negative electrode and a second fixing portion that is coupled with the case, the second fixing portion being provided at a central portion of the collecting plate and comprising a protrusion protruding toward a first surface of the case, and the first fixing portions being arranged radially around the second fixing portion and protruding away from the first surface of the case,
wherein a buffer portion is provided between each first fixing portion and the second fixing portion to alleviate a force exerted on the collecting plate.

12. The battery of claim 11,
wherein the first fixing portions comprise contacting parts;
wherein the buffer portion comprises cut portions that are provided between the protrusion and the contacting parts, and wherein the cut portions are formed by cutting portions of the contacting parts.

13. The battery of claim 12,
wherein a recess is formed on an inner surface of the protrusion,
wherein the contacting parts are disposed radially about the collector plate, and
wherein the cut portions are disposed adjacent to the recess to extend in longitudinal directions of the contacting parts.

14. The battery of claim 12,
wherein wrinkle portions are provided between the protrusion and the cut portions.

15. The battery of claim 12,
wherein a thickness of the collecting plate, d and a distal length between the protrusion and a cut portion, L have a relationship represented by the following equation:

$$L>5d.$$

16. The battery of claim 11,
wherein the rechargeable battery has a substantially cylindrical shape.

17. The battery of claim 11,
wherein the second fixing portion is welded to the first surface of the case.

18. A motor, comprising: the battery of claim 11.

* * * * *